June 3, 1969

F. M. SHIFLET

3,447,628

CONTROL SYSTEM FOR SYNCHRONOUSLY CONTROLLING THE OPPOSED
ROTATION OF ACOUSTICAL ELEMENTS ABOUT COINCIDENT
OR PARALLEL AXES

Filed Oct. 31, 1966

INVENTOR.
FOEY M. SHIFLET

BY
Dunlap and Laney
ATTORNEYS

INVENTOR.
FOEY M. SHIFLET
BY
Dunlap and Haney
ATTORNEYS

June 3, 1969

F. M. SHIFLET 3,447,628

CONTROL SYSTEM FOR SYNCHRONOUSLY CONTROLLING THE OPPOSED
ROTATION OF ACOUSTICAL ELEMENTS ABOUT COINCIDENT
OR PARALLEL AXES

Filed Oct. 31, 1966

INVENTOR.
FOEY M. SHIFLET

BY
Dunlap and Laney
ATTORNEYS

United States Patent Office 3,447,628
Patented June 3, 1969

3,447,628
CONTROL SYSTEM FOR SYNCHRONOUSLY CONTROLLING THE OPPOSED ROTATION OF ACOUSTICAL ELEMENTS ABOUT COINCIDENT OR PARALLEL AXES
Foey M. Shiflet, 1466 Tanglewood St., Abilene, Tex. 79605
Filed Oct. 31, 1966, Ser. No. 590,698
Int. Cl. E04b *1/99*
U.S. Cl. 181—30                                    14 Claims

ABSTRACT OF THE DISCLOSURE

A control system for controlling and synchronizing the rotational movement of a pair of rotatable sound controlling elements, including a substantially instantaneously reversible motor which drives a take-up drum. A main drive cable is connected to the drum for winding up or letting out, and local control flexible lines or elements are connected between the main drive cable and the sound controlling elements to uniformly and simultaneously move these elements in opposite rotational directions from each other about parallel or coincident rotational axes. The system further includes a sound sensing or detecting device which responds to variations in sound caused by movement of the sound controlling elements to de-energize the motor when the sound controlling elements have been moved by the system to an optimum position.

---

This invention relates to a system for synchronously controlling the rotational movement of pairs of rigid elements which are arrayed for rotational movement about a common axis, or about a plurality of horizontally extending axes. The invention has particular utility in providing continuous and effective control for a plurality of ceiling or wall-mounted acoustic control units of the type which may be employed for varying in a predetermined fashion, the acoustic properties of a room or other enclosure.

In Coffman U.S. Patent 3,049,190 issued Aug. 14, 1962, a system is disclosed for controlling the acoustics in a room or auditorium so as to better adapt the space in which the system is used to the performance of various types of programs producing sounds of varying frequency and intensity. The acoustic control system includes a plurality of sectors of cylinders (preferably quadrants) which are operated in pairs and are mounted on the ceiling or wall of the room or auditorium. The cylindrical sectors each include sound absorbing and sound reflecting surfaces which are varied in their positions relative to the interior of the room so as to alter the reverberation time at the location of an audience within the room. The acoustical properties of the enclosure can thus be selectively varied in a manner which adapts the enclosure to the performance of a great variety of types of programs therein.

The invention described in the cited Coffman patent is built around, and directed primarily to, the construction and orientation of the sectors of cylinders which are the structures immediately affecting, and used to vary, the acoustic properties of the enclosure in which they are located. A simple, basic control and drive system used for altering the position of the several cylinder sectors is illustrated and described in the Coffman patent, but is disclosed primarily as an incident to the disclosure of the method of use of the cylindrical sectors rather than as an optimum or preferred drive and control system for varying the position of the critical elements, i.e., the cylinder sectors.

The present invention provides a novel drive and control system which can be effectively used for automatically controlling in a predetermined fashion, the position of the cylinder sectors used for acoustic control and variation of acoustic properties as described in the Coffman patent. In a broader aspect, the control system of the present invention can also be employed for controlling the rotational position of pairs of rotatably mounted mechanical units as they might be employed in a variety of systems having more general application than the control of acoustic properties within an enclosure.

Described broadly, and without reference to its preferred utilization in combination with acoustic control panels, the control system of the present invention comprises (as it is used for controlling and synchronizing the rotational movement and positioning of at least one pair of rotated elements so as to move these elements concurrently in opposite directions about a common axis or about parallel axes) a prime mover which includes means for providing rotational movement in either direction (i.e., clockwise or counterclockwise) with substantially instantaneous reversal of the direction of rotational movement. A take-up drum is drivingly connected to the prime mover and is driven in rotation thereby. A main drive flexible element is connected to the take-up drum for winding upon the periphery of the drum as the drum is rotated in one direction, and for unwinding from the periphery of the drum during the reverse rotation thereof. The main drive flexible element, in the preferred embodiment of the invention, is a cable or wire rope, but other types of flexible members can also be utilized.

A shaft is provided for the support of each of the elements which are to be rotated synchronously in opposite directions about a common axis or about parallel axes. Local control means is then provided which includes a plurality of elongated flexible members drivingly connected to the rotatable elements which are to be concurrently and synchronously rotated in opposite directions, and are also connected to the main drive flexible element. The local control means functions to uniformly and simultaneously move the rotated elements in opposite directions about their respective axes when the take-up drum is rotated in either direction. Finally, means is provided which is responsive to the rotation of the take-up drum through a predetermined arc in either direction of rotation to de-energize the prime mover.

In a preferred embodiment of the invention, the local control means, which is provided as described in the preceding paragraph, includes at least one intermediate drive shaft which is rotatably journaled for rotation about its axis and is positioned in the vicinity of the rotated elements which are to be controlled by the control system of the invention. Flexible members, such as cables or the like, are then connected to each of the rotated elements in each pair of rotated elements which are to be controlled by the system and the flexible members are also connected to the intermediate drive shaft for winding around the intermediate drive shaft as it is rotated about its axis in one direction. The manner of connection of the flexible members to the rotated elements to be controlled is such that, as the local flexible members are wound about the intermediate drive shaft, their connection to the rotated elements in each pair of these elements will cause the rotated elements to move simultaneously and at a uniform rate in opposite directions about their respective axes of rotation.

For the purpose of causing the intermediate drive shaft to move in rotation in a controlled and predetermined manner, the local control means further includes an operating pulley which is keyed to the intermediate drive shaft at some point along its length, and an intermediate flexible connector element which is connected between the main drive flexible element and the operating pulley. The intermediate flexible connector element causes the pulley and the drive shaft to which the pulley is keyed to be moved in rotation when the main drive flexible element is placed in tension by the rotation of the take-up drum to which it is connected.

As previously indicated, the described control system is especially useful and advantageous when employed in combination with an acoustic control system of the type described in Coffman U.S. Patent 3,049,190. In such system, the rotated elements which are to be controlled by the control system of this invention take the form of elongated sectors of cylinders in which a planar face is provided and is constructed of sound reflecting material, and an arcuate face is provided and is constructed of a sound absorbing material. The cylinder sectors are preferably operated in pairs, and any number of pairs of the acoustic control sectors can be utilized, the number depending upon the requirements of the particular auditorium or room in which the system is to be employed. The control system of the present invention, when used conjunctively with an acoustic control system employing simultaneously rotated cylinder sectors, provides for effective and semi-automatic control of the acoustic properties of a building from a single remote location and, in certain specific embodiments hereinafter to be described, in conformity with the sensed intensity of the sound being generated within the space in which the system is installed.

From the foregoing description of the invention, it will have become apparent that it is an important object of the present invention to provide an improved control system which may be used for controlling and synchronizing the rotational movement and positioning of at least one pair of rotated elements in opposite directions about a common axis or about parallel axes, with control being provided from a remote location.

A more specific object of the invention is to provide a system for controlling from a remote location, the position of cylindrical sectors utilized along a wall or ceiling of a room or auditorium for the purpose of altering the acoustic properties of the enclosed space in correspondence to the particular position to which such cylindrical sectors are moved.

Another object of the present invention is to provide a system for controlling the orientation of acoustic control elements relative to an environment in which the acoustics are to be altered, with such control effected from a remote location and being made responsive to the properties of sound being produced in such environment.

An additional object of the invention is to provide a relatively economically and simply constructed system for remotely controlling the acoustic properties in an auditorium or other enclosed space.

In addition to the foregoing described objects and advantages, additional objects and advantages will become apparent as the following detailed description of the invention is read in conjunction with the accompanying drawings which illustrate the invention.

Figure 1:
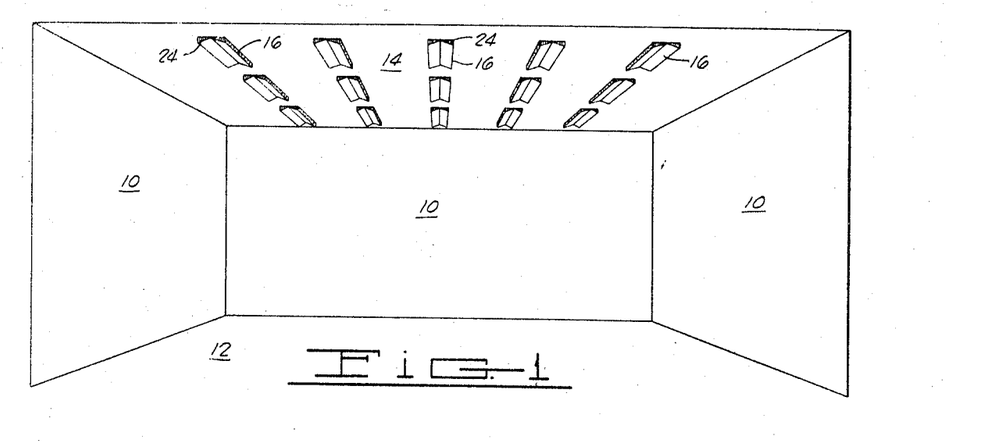
FIGURE 1 is a perspective view of an auditorium or room in which an acoustic control system constructed in accordance with one embodiment of the present invention is located.

Referring now to the drawings in detail, and particularly initially to FIGURE 1, an exemplary application or utilization of the control system of the present invention is there depicted, and contemplates the use of the control system for controlling the movement of pairs of sectors of cylinders which are mounted in the wall or ceiling of a room in which the acoustics are to be varied as desired. This utilization of the control system will be referred to for purposes of description of the invention, since utilization for such acoustic control in enclosed spaces constitutes a preferred, though not sole, employment of the control system of the invention, and also since this preferred application lends itself to a clear revelation of the advantages of the control system, and the manner in which it operates.

Figure 5:
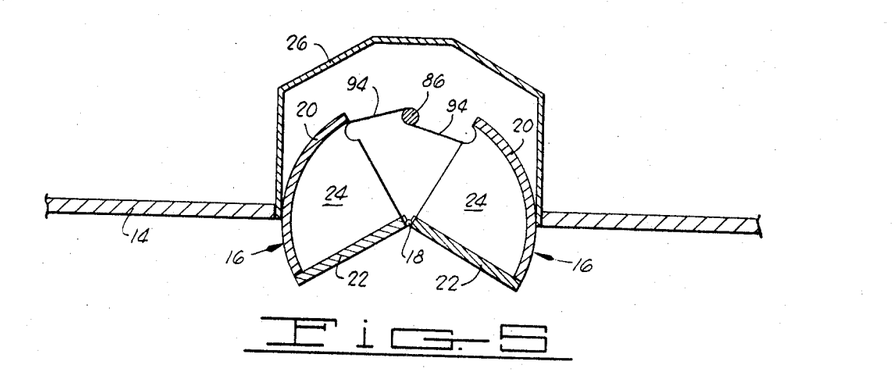
FIGURE 5 is a sectional view taken along line 5—5 of FIGURE 3.
Figure 6:
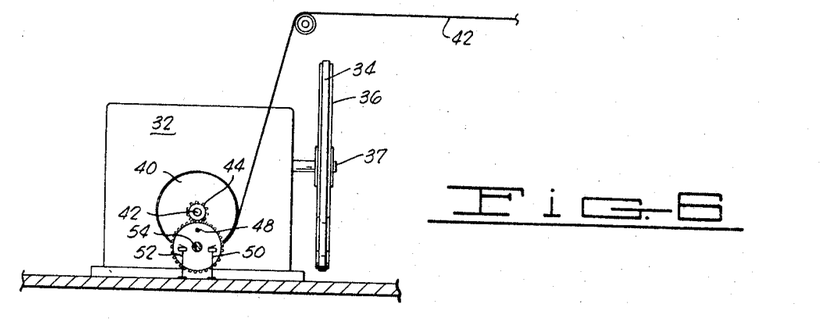
FIGURE 6 is an end view of the gear reducer, cable drum and gear drive used as a portion of one embodiment of the control system of the present invention, such embodiment being the same as that which is depicted in part in FIGURE 2.

Referring then to FIGURE 1, the depicted enclosure, which may be an auditorium, church, schoolroom or similar structure, includes walls 10, a floor 12 and ceilings 14. For the purpose of permitting the reverberation time within the room to be altered so as to adapt the room to the performance of different types of programs therein, a plurality of sectors of cylinders 16 of the general type depicted in FIGURE 1, and more specifically illustrated in cross-section in FIGURE 5, are provided in a paired arrangement in the ceiling 14. The pairs of cylinder sectors 16 may be located in either the ceiling, as depicted, or in the walls, or in both. The pairs of sectors may be grouped in what will hereinafter be termed bays, a bay being herein defined as a group of one or more pairs of cylinder sectors used for acoustic control purposes, and controlled as a unit by the use of the control system of the present invention. The control system may be used to control one or a plurality of bays, the general principles applicable to such control applying equally in either instance.

In the arrangement of the sections of cylinders 16 which is depicted in the present application in FIGURES 1 and 5, these sectors are secured in the ceiling so that each pair of sectors is pivotally connected to a common pivot shaft 18 (see FIGURE 5) and pivots about a common pivotal axis. The pivotal axes of the two sectors could, however, extend parallel to each other should such an arrangement be preferred. Each sector 16 is formed as a quadrant of a cylinder having an arcuate surface 20 of sound absorbing material, and a planar surface 22 of sound reflecting material. The other radial plane of the cylinder quadrant 16 is open. Each of the cylinder quadrants 16 may be closed at each end by a suitable end plate 24 which will preferably also be coated on its outer or exposed surface with a sound absorbing material.

Figure 3:
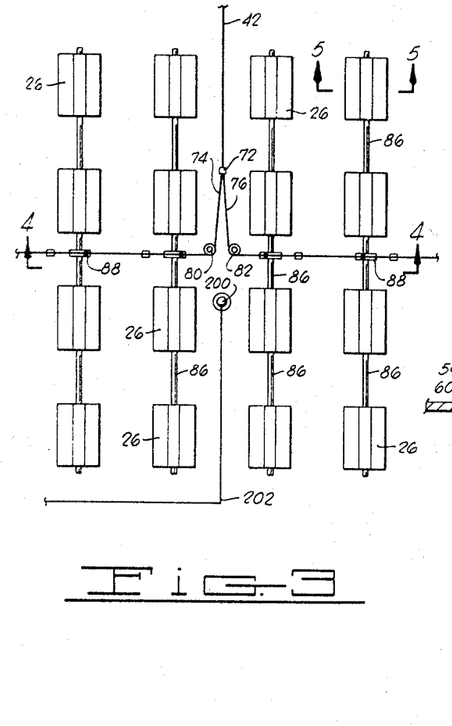
FIGURE 3 is a schematic view of a portion of the control system of the invention shown connected to acoustic control sectors or quadrants for the purpose of rotating the sector or quadrant pairs in opposite directions about a common axis or about parallel axes.

As mounted in the ceiling 14 or in a wall (as not illustrated), the quadrants used in the embodiment of the invention here under discussion are positioned so that when the cylinders are rotated to one position, the sound reflecting planar surfaces 22 of each of the cylinder quadrants in each pair are aligned in coplanar alignment with each other, and with the ceiling 14. Stated differently, in this position the sound reflecting surfaces 22 of the two cylinder quadrants in each quadrant pair are flush with the plane of the ceiling 14, and the sound absorbing, arcuate surfaces 20 are withdrawn completely within the ceiling and, in the depicted embodiment, are enclosed by a housing 26 which is provided above the ceiling and is not visible to the audience located beneath the ceiling in the room or auditorium. A bay which includes a number of these housings 26 as they would appear when viewed from above the ceiling and looking down on them is depicted in FIGURE 3. As previously indicated, such a bay of pairs of acoustic control elements can be controlled as a unit by the control system of the present invention, or, as will hereinafter be explained, a plurality of such bays can be provided and controlled by the use of the control system, as is hereinafter explained.

Before proceeding to a more detailed description of the control system which constitutes a salient aspect of the present invention, the manner in which the cylinder quadrants 16 hereinbefore described function for controlling the acoustic properties of the auditorium or room will be briefly discussed. In such acoustic control by the use of the cylinder quadrants 16, the function of such quadrants is to alter the reverberation time at the location where an audience will be positioned within the enclosure by varying at least three characteristics of the room or auditorium which directly affect such reverberation time. These characteristics are the sound absorption characteristic of the surfaces upon which sound waves produced within the space impinge in their course of travel to the audience where reflection from such surfaces is involved, the total volume of the auditorium or room, and the surface area of the auditorium or room.

Considering each of these parameters individually, the provision of a sound reflecting, as contrasted with a sound absorbing surface, in the walls or ceiling of the room will increase the reverberation time and adapt the room more suitably for the performance of music than speaking, for example. In the same fashion, the provision of an increased volume within the room will also increase the reverberation time, and will better adapt the room for the performance of music than for oral presentations. Finally, a decrease in the total surface area upon which the sound will impinge in being reflected from the walls or ceiling to the audience will also increase the reverberation time and adapt the room more suitably for the performance of music than for an oral presentation.

Referring then to FIGURES 1 and 5 of the drawings, it can be perceived that, as the cylinder quadrants 16 are rotated about their common rotational axis represented by the pivot shaft 18, they may alternately be withdrawn into the ceiling to provide a planar ceiling contour in which the sound reflecting surfaces are exposed, or they may be rotated out of the ceiling so that in their extreme position of rotation out of the ceiling, a semicylindrical protuberance is provided extending down from the ceiling and offering to impingement by the sound, a sound absorbing surface. Thus, the described movements of the cylinder quadrants 16 alternately offer either a room (a) in which the ceiling is of minimum surface area and the total volume within the auditorium or room is of a maximum concurrently with the exposure to the source of sound of sound reflecting surfaces, or (b) in which the total volume is decreased by rolling out the arcuate sides 20 of the quadrants 16 to the point where a semicylindrical protuberance is formed, and concurrently with such alteration in the total volume of the room, the total surface area on which the sound will impinge is increased and a sound absorbing surface is exposed which will also have the effect of increasing the reverberation time within the room.

Having considered the manner in which the cylinder quadrants 16 may be made to function to permit controlled alteration of the acoustic properties of the room in which they are utilized, consideration will next be given to the control system of the present invention which permits the positioning or location of the pairs of cylinder quadrants 16 to be constantly controlled in a desired manner so as to efficiently and continuously adapt the acoustic properties of the room or auditorium to the type of program which is being performed, or is to be performed, therein. In such control, it will perhaps immediately become apparent that instantaneous control is desirable, and it is further to be desired that such control be effected in accordance with the sensed acoustic properties within the auditorium, so that assurance may be had that the actual acoustic properties accord with the properties which are desired at a particular time. It is further desirable that the control system provide selective control for a plurality of bays of the cylinder quadrant pairs where a number of such bays are used in order to effectively tailor the properties of large rooms or auditoriums having rather irregular geometric shapes to the necessities of a particular type of program being presented therein.

Figure 2:
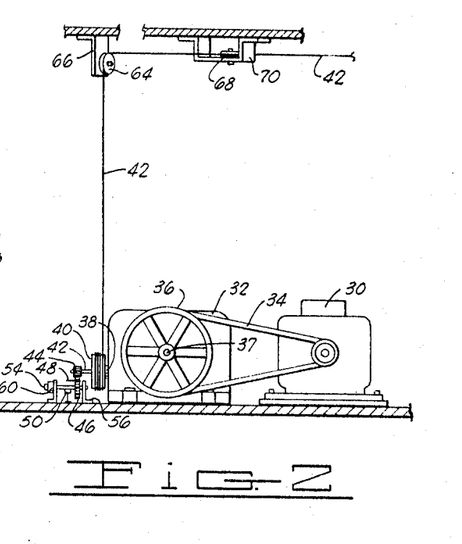
FIGURE 2 is a view, partly in elevation and partly in perspective, of the motor, gear reducer, cable drum and main drive cable used in the drive used in one embodiment of the invention.

Referring to FIGURE 2, there is here depicted a power source for the operation of the control system. The power source includes, in the illustrated embodiment, a suitable reversible electric motor 30 which can be mounted at any convenient location and which can be positioned at a location which is quite remote with respect to the acoustic control cylinder quadrants 16. A suitable instantly reversible type motor is the motor now marketed by the General Electric Company of Schenectady, N.Y.

The motor 30 drives a gear reducer 32 through a V-belt 34 and pulley 36 connected to a shaft 37 of the gear reducer, the flexibility of this system preventing damage or destruction of the gear reducer upon instantaneous reversal of the motor 30. An output shaft 38 from the gear reducer 32 carries a cable drum 40 upon which is wound one end of an elongated flexible main drive cable 42. The shaft 38 which carries the cable drum 40 has a portion 42 extended therethrough with such shaft extension portion 42 carrying a small gear 44 at its outer end. The small gear 44 meshes with a larger gear 46 which has fixed thereto a limit switch pin 48 positioned to contact at different times a pair of limit switches 50 and 52 which are spaced from each other. The arrangement is such that the limit switch pin 48 may contact and open each of the limit switches 50 and 52 at certain times during the partial rotation of the gear 46. The function of this arrangement will be hereinafter described.

The gear 46 is mounted upon and keyed to a shaft 54 which is journaled in a pair of suitable brackets 56 and is connected at its outer end to the movable tap of a potentiometer 60. This potentiometer 60, which will be hereinafter termed the motor potentiometer, forms a portion of the electrical circuitry used in automatically controlling the movement of the cylinder quadrants 16 used in the acoustic control system (or other elements in other applications of the control system), and its operation will be hereinafter described in greater detail.

The main control cable 42 extends from the cable drum 40 over one or more intermediate pulleys or sheaves, such as the pulley 64 mounted on the L-shaped bracket 66 and the pulley 68 mounted in the U-shaped bracket 70 as depicted in FIGURE 2. The pulleys which are thus provided are merely to afford change in the direction of extension of the main control cable 42 of the control system, and their number and particular location may be selected in accordance with principles well known in the art for the purpose of leading the main control cable into the proximity of a bay of acoustic control quadrants 16 which is to be controlled by the control system.

In referring to FIGURE 3 of the drawings, it will be noted that the main control cable 42 extends to a point positioned over the approximate center of a bay of cylinder quadrants 16 which is to be controlled. At this point, the main control cable 42 is connected through a drive cable yoke 72 to a pair of intermediate cables 74 and 76. These intermediate cables 74 and 76 branch from the main control cable 42 in opposite directions and are passed about suitable pulleys 80 and 82 so at to permit the branch cables 74 and 76 to extend transversely or normal with respect to a plurality of parallel, elongated intermediate drive shafts, each of which is designated by reference numeral 86. Each of the intermediate drive shafts 86 has keyed thereto an operating pulley 88 which is located at a central position on the shaft between spaced pairs of the cylinder quadrants 16 used for altering the acoustic properties of the room. A series of terminal cables 90 branch from the intermediate cables 74 and 76 and are extended around and have one end secured to one of the operating pulleys 88.

Figure 4:
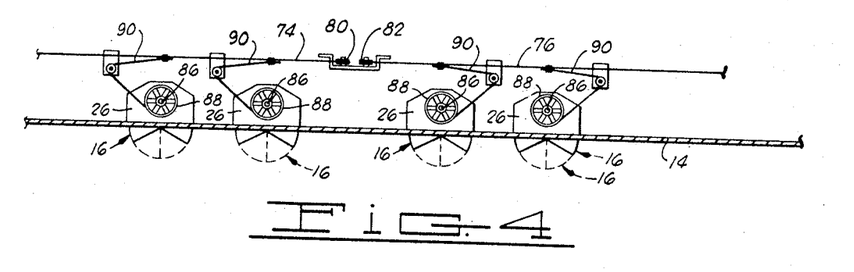
FIGURE 4 is a sectional view taken along line 4—4 of FIGURE 3.

Referring next conjunctively to FIGURES 3, 4 and 5, it will be perceived that the intermediate shafts 86 are extended through, and journaled in, the housings 26 which enclose the rotatably mounted pairs of cylinder quadrants 16 hereinbefore described. In the type of bay array which is illustrated, for example, in FIGURE 3, the bay includes sixteen pairs of cylinder quadrants 16 mounted in sixteen individual housings 26, such housings, as previously indicated, being positioned in the ceiling and rotatably journaling the intermediate shafts 86. It will further be noted in referring to FIGURES 3 and 5 that the rotation of any one of the operating pulleys 88 will effect the rotation of the respective intermediate shaft 86 upon which such control pulley is located with the result that the intermediate shaft can be used to control the four sets or pairs of cylinder quadrants 16 located in the four aligned housings 26 through which that particular intermediate shaft is passed. In referring to FIGURE 5, it will be noted that each intermediate shaft 86 is spaced above the plane of the ceiling 14, and has connected thereto a pair of flexible connecting elements 94 which are connected to the periphery of the intermediate shaft 86 so as to be wound thereon as the intermediate shaft is rotated, and which have one end connected to the respective cylinder quadrants 16. The end plates 24 of the cylinder quadrants 16 are recessed to accommodate the intermediate shaft 38 and permit the quadrants to abut each other, and the sound reflecting surfaces 22 of each to be positioned in coplanar alignment at such time as the flexible connecting elements 94 are wound upon the shaft 86 to completely retract the quadrants. Reverse rotation of the intermediate shaft 86 will unwind the connecting elements 94 and permit the quadrants 16 to move downwardly under their own weight, ultimately to a position in which the sound reflecting surfaces 22 abut each other, and the two quadrants form a semicylindrical protuberance projecting down from the ceiling. Since all of the pairs of quadrants 16 associated with the intermediate shaft 86 and connected thereto for actuation by this shaft are positioned identically with respect to the shaft, rotation of the intermediate shaft will cause the quadrants to be simultaneously rotated out of the ceiling or retracted to identical positions with respect to the plane of the ceiling 14.

Before discussing in detail several types of electrical circuits that can be used in combination with the mechanical aspects of the control system hereinbefore described, it is believed that the clarity of the description may be aided by summarizing at this time, the general manner in which that portion of the system which has been thus far described operates. When the reversible motor 30 is energized so that it runs in one direction or the other, the cable drum 40 is caused to rotate through the intervening instrumentalities of the shaft 38, the gear reducer 32, the pulley 36, and the V-belt 34. Rotation of the cable drum 40 in one direction will shorten, or place in tension, the main control cable 42, and in the opposite direction will slacken it and permit it to be lengthened. Assuming then, for example, that the main control cable 42 is initially wound upon the cable drum 40, the result of this action is to place the intermediate cables 74 and 76 in tension, and also to tension the several terminal cables 90. This will in turn cause rotation of the operating pulleys 88 to which the terminal cables 90 are attached, with consequent rotation of the intermediate shafts 86. The arrangement will assure that each of the intermediate shafts 86 are rotated through an identical degree of rotation, and such rotational actuation of the intermediate shafts will cause a simultaneous and identical retraction or withdrawal of all of the cylinder quadrants 16 into the ceiling. This retraction of the quadrants may be interrupted at any time by stopping or reversing the motor 30, one at-rest, intermediate position of the quadrants being that illustrated in FIGURES 1 and 5. Continued rotation of the motor 30 in a proper direction to tension the main control cable 42 will, however, eventually bring the cylinder quadrants 16 to a fully retracted position in which the sound reflecting surfaces 22 are in coplanar alignment with the ceiling 14.

At this time, the motor 30 must be stopped either by manual control or automatically to avoid damaging the system. In the illustrated embodiment, the limit switches 50 and 52 function as stop devices preventing overrunning or overshooting of the motor 30, such switches being, in general, interposed in the electrical circuitry to the motor 30 and being normally closed until contacted by the limit pin switch 48. The contact of one or the other of the limit switches 50 or 52 by the limit switch pin 48 will open the electrical circuit to the motor, and it will immediately discontinue its rotation. (It will be apparent to those skilled in the art that a suitable automatic brake for the motor should be provided to prevent coasting or continued rotation of the shaft of the motor after the electrical power thereto have been interrupted.) The limit switches 50 and 52 thus are provided to prevent damage to the cables or to the quadrants 16 by retracting them beyond their physical limit of travel into the ceiling, as well as to prevent the development of excessive slack in the cables 42, 74, 76 and 90 as a result of the motor continuing to run after the quadrants have been permitted to rotate to their fully extended positions in which they form the heretofore described semicylindrical protuberances extending downwardly from the ceiling.

Figure 8A:
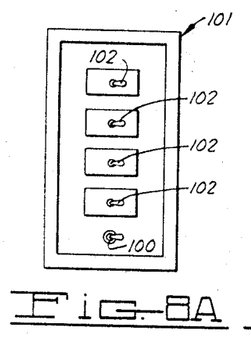
FIGURES 8a–8c are views in elevation of several types of control panels which can be used in the control system of the present invention.

Having described the mechanical construction and operation of one embodiment of the control system as it is employed for controlling the movement, for example, of pairs of cylinder quadrants used in a typical acoustic control bay array, several novel electrical control systems which can be employed in combination with the described structure for semiautomatically controlling the motor 30 and the position of the oppositely rotated structural elements will next be described. A control panel 101 employed in a relatively simple electrical circuit used to control the energization of the reversible motor 30 is depicted in FIGURE 8a. The control panel 101 here depicted includes a main On-Off switch 100, and a plurality of three-position (On-Off-On) switches 102 corresponding in number to the number of bays of cylinder quadrant pairs which are to be controlled by the use of the control system of the invention. In the illustrated control panel 101, four three-position switches 102 are illustrated, and are employed to control four different bays similar to the one shown in FIGURE 3 and positioned at different locations within the auditorium. The three positions of the switches 102 which are provided are utilized for (a) turning off the reversible motor 30 associated with each bay or, alternately, for (b) causing the motor to turn in a clockwise or (c) counterclockwise direction as may be desired. The main On-Off switch is, of course, provided for the purpose of delivering power to the whole system which includes all four bays.

Thus, the relatively simple control provided by the circuitry which includes the control panel shown in FIGURE 8a would permit an operator to initially close the circuit for the general availability of power for energizing all four reversible motors 30 provided in association with the four bays to be controlled. Then, as might be required by a particular type of program to be presented in the auditorium containing the four bays, the operator would place an appropriate setting on the cylinder quadrants 16 located in each of the four bays by selective manipulation of the three-way switch 102 associated with each bay. Should it be desirable, for example, to rotate all of the quadrant pairs in one bay to their fully extended positions, this can be accomplished by moving the appropriate one of the three-position switches 102 to the proper position to effect rotation of the motor 30 controlling that bay in the proper direction to rotate the cylindrical quadrants outwardly to their extended positions. The other bays might be controlled in a similar fashion, or the quadrants 16 therein might be rotated in a direction to retract them. The operator would, of necessity, with this simple control circuit, find it necessary to visually observe the position of the cylinder quadrants 16 with respect to the ceiling, and then empirically and based upon experience, set the quadrants 16 at what is visually estimated to be a proper location to effect the desired changes in the acoustic properties of the room, considering the type of program which is to be performed.

Figure 7:
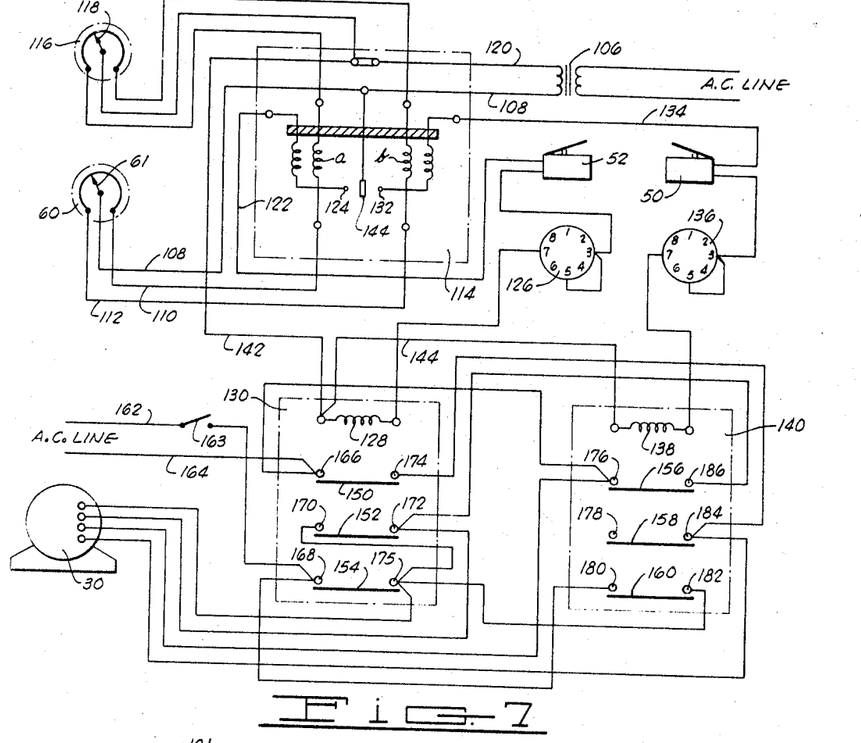
FIGURE 7 is a schematic wiring diagram illustrating electrical circuitry used to control the actuation of the mechanical elements employed in the embodiment of the control system of the present invention which is depicted in FIGURES 2–6.

A more sophisticated and considerably more effective electrical circuit than that which, though not shown, is impliedly associated with the control panel shown in FIGURE 8a, and which can be used for controlling the energization of the reversible motor 30, is depicted in FIGURE 7 of the drawings. In this figure, the reversible motor 30 is illustrated schematically, and is connected through the electrical circuitry to a suitable source of alternating current. Alternating current is also delivered from the same or a different source to a transformer 106. One side of the secondary of the transformer 106 is connected through a lead 108 to the movable tap 61 of the motor potentiometer 60, which movable tap is connected also to the rotating shaft 54 which supports the gear 46 as previously described in referring to FIGURE 2. The movable tap 61 of the motor potentiometer 60 is thus moved in correspondence to the energization of the reversible motor 30 to rotate the cable drum 40.

The motor potentiometer 60 is also connected by leads 110 and 112 in a network which includes two coils *a* and *b* of a swinging relay 114, and a second potentiometer 116 which is mounted on a suitable control panel (hereinafter described) which is accessible to operating personnel. The control panel potentiometer 116 has its movable tap 118 mechanically connected to an adjustment knob at the control panel, and electrically connected to the second lead 120 from the secondary of the transformer 106.

A lead 122 extends from one stationary contact 124 of the swinging relay 114 through the normally closed counterclockwise limit switch 52 and through a counterclockwise time delay relay 126 to the coil 128 of a counterclockwise motor relay 130 (represented by the dashed line box at the lower left of FIGURE 7). The other stationary contact 132 of the swinging relay 114 is connected by a lead 134 through the clockwise limit switch 50, and through a clockwise time delay relay 136 to the coil 138 of a clockwise motor relay 140. The circuits through the coils 128 and 138 of the counterclockwise and clockwise motor relays 130 and 140, respectively, are completed by means of leads 142 and 144 which are connected from the coils 128 and 138, respectively, to the lead 120 which is connected to one end of the secondary of the transformer 106. The final element of the swinging relay 114 is a free swinging contact 144 which is positioned to be moved by energization of one of the coils *a* or *b* of the swinging relay into contact with either the stationary contact 124 or the stationary contact 132 as more clearly described hereinafter.

Each of the motor relays 130 and 140 is provided with a series of movable contacts, these being designated by reference numerals 150, 152 and 154 in the case of the counterclockwise motor relay 130, and by reference numerals 156, 158 and 160 in the case of the clockwise motor relay 140. Power from a source of alternating current is introduced to the motor relays 130, 140 by means of leads 162 and 164, one of which contains a main ON-OFF switch 163. These leads are connected to stationary contacts 166 and 168, respectively, provided in the counterclockwise motor relay 130. In addition to these contacts, the counterclockwise motor relay 130 is also provided with stationary contacts 170, 172, 174 and 175, the function of which will be hereinafter explained. The fixed contacts which are provided in the clockwise motor relay 140 are designated by reference numerals 176–186 and are depicted in FIGURE 7.

In the operation of the electrical control circuitry depicted in FIGURE 7, let it be initially assumed that, though the main ON-OFF switch 163 is closed, all of the movable contacts of the counterclockwise and clockwise motor relays 130 and 140 are open, and that there is therefore no electrical power being delivered from the leads 162 and 164 to the reversible motor 30. For this situation to prevail, it is necessary that the movable contact 144 of the swinging relay 114 be in its central or open position as depicted in FIGURE 7 so that electrical current does not flow in either of the coils 128 or 138 of the motor relays 130 and 140. This position of the movable contact 144 of the swinging relay 114 will be realized at such time as the network which contains the potentiometers 60 and 116 is balanced so that equal resistance to current flow is provided through the opposite sides of the network containing the coils *a* and *b* of the swinging relay 114.

Let it be next assumed that an operator at a control panel which contains the control panel potentiometer 116 perceives that an adjustment in the position of acoustic control cylindrical quadrants which are to be rotated by energization of the reversible motor 30 is required in order to impart the desired acoustic properties to a room in which the cylindrical quadrants are located. With foreknowledge of a given position or setting on the control panel potentiometer 116 which will result in movement of the cylindrical quandrants to the desired control position, the operator then moves, by the use of a suitable control knob, the movable tap 118 of the control panel potentiometer 116 to a position such that this potentiometer indicates the desired control reading. The described movement of the movable tap 118 of the potentiometer 116 will unbalance the network which contains the two opposed coils *a* and *b* of the swinging relay 114 so that a larger current is permitted to flow through one of the coils than through the other. This will result in the movable contact 144 of the swinging relay 114 moving against either the contact 124 or the contact 132, depending upon which of the coils carries the greater current.

Assuming that the movable contact 144 has moved against the fixed contact 124 of the swinging relay 114, this action will complete an electrical circuit through the counterclockwise limit switch 52, the time delay relay 126 and the coil 128 of the counterclockwise motor relay 130, so that the coil 128 is energized and the movable contacts 150, 152 and 154 of the counterclockwise motor relay 130 close the three pairs of stationary contacts 166–174; 170–172; and 168–175. Energization of the counterclockwise motor relay 130 thus permits a circuit to be completed from the power input leads 162 and 164 through the illustrated circuitry contained within the two motor relays 130 and 140 to the appropriate windings of the reversible motor 30 to effect rotation thereof in one direction.

As the reversible motor 30 rotates in this direction, it turns with it the movable tap 61 of the motor potentiometer 60. This direction of rotation of the movable tap 61 of the motor potentiometer 60 is such that the network which contains the motor potentiometer 60, the control panel potentiometer 116 and the swinging relay 114 is brought back into balance and substantially equal currents flow through the two opposed coils *a* and *b* of the swinging relay 114. The movable contact 144 of the swinging relay 114 is released and returns to its center position. This will in turn interrupt the circuit to the coil 128 of the counterclockwise motor relay 130 so that this relay is de-energized and the motor is stopped. Thus, the motor may be said to automatically answer the setting which is placed by the operator on the control panel potentiometer 116, and to automatically terminate its rotation at such time as the setting on the motor potentiometer 61 matches that on the control panel potentiometer 116. If the operator knows, in advance, the correlation or correspondence between the settings on the control panel potentiometer 116, and the various positions of the cylindrical quadrants which impart known acoustic properties to the room or auditorium, automatic control of such acoustic properties can be effected merely by placing the proper setting on the control panel potentiometer 116.

The delay relays 126 and 136 function to delay the energization of the clockwise and counterclockwise motor relays 130 and 140 and thus to delay the application of power to the electric motor 30. This enables the motor 30 to undergo a time delay before reversing direction of rotation.

A more accurate and desirable control of acoustic properties is provided when one or more microphones or pickup probes are provided in association with each bay of the cylindrical quadrant pairs for the purpose of constantly monitoring or sensing the intensity of the sound in the vicinity of, or immeidately beneath, the bay. Such a mircrophone or sound pickup probe is schematically depicted in FIGURE 3 and is designated by reference numeral 200. In an arrangement in which a single probe is utilized for each bay, it is preferably disposed somewhere near the center of the bay array with which it is used. A lead 202 is extended from the probe 200 to a suitable meter located on the operator's control panel and constructed to provide an indication of the sound intensity in decibels or other suitable units of sound intensity.

Figure 8B:
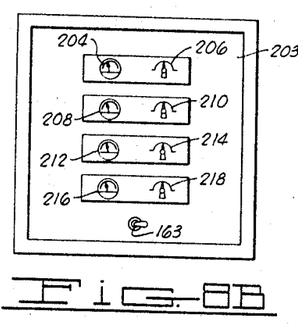

In the control panel 203 depicted in FIGURE 8b, the panel includes a main ON-OFF switch 163 corresponding to the main ON-OFF switch shown in FIGURE 7, and control panel potentiometers and sound intensity meters in a number of sets adequate to control four separate bays of cylindrical quadrants. Thus, an intensity meter 204 (which can conveniently be graduated in decibels) is provided in association with a potentiometer control knob 206 for automatically controlling the position of the quadrant pairs in a first bay. Three other bays are also susceptible to control from the control panel 203 by means of the paired intensity meters and potentiometers 208–210, 212–214 and 216–218, respectively. The main control switch 163 may be considered as interposed in the common leads from a common source of electrical power to all of the four reversible motors 30 used in conjunction with each of the four bays.

As previously indicated, a microphone or sound pickup probe is associated with each of the bays of cylindrical quadrants provided for altering the acoustic property of the room. These probes are connected by suitable leads to their respective intensity meters and the intensity of the sound in the vicinity of each of the bays is indicated to the operator at the control panel 203 by the position of the pointers on the several intensity meters 204, 208, 212 and 216. Let it be assumed that in utilizing a control system employing electrical circuitry of the type shown in FIGURE 7 and a control panel of the type depicted in FIGURE 8b, the operator or control engineer, during the course of a performance, perceives that the intensity meters 204 and 216 for two of the bays indicate that the sound intensity adjacent those bays is either greater or less than is optimum for enjoyment of the performance by the audience. The indicator pointers of the two intensity meters 204 and 216 will thus be pointing to some location on the dials other than that which is indicative of optimum intensity, and the operator's task will be to manipulate the system to bring the intensity meters to the desired readings, thus indicating optimum sound intensity in the vicinity of the particular bay which requires adjustment. The operator will effect such adjustment to bring the intensity meters 204 and 216 to the desired reading by manipulating the movable tap of the appropriate control panel potentiometers—in the case under consideration, potentiometers 206 and 218.

The direction in which the pointers of the intensity meters 204 and 206 deviate from their optimum readings will indicate to the operator whether the correction to be made is in the nature of increasing or decreasing the sound reverberation time and, accordingly, of extending outwardly or retracting inwardly, the pairs of cylindrical quadrants in the bays under consideration. With foreknowledge of the direction in which the movable taps of the respective potentiometers should be moved in order to effect correction, the operator will move the taps in this direction by an amount which approximates that required to effect the desired alteration in acoustic characteristics in the vinicity of the bays which require correction. By final fine adjustments in the potentiometers 206 and 218, the operator can ultimately bring the intensity meters 204 and 216 to the desired reading thus assuring himself that the audience located beneath or in the immediate vicinity of the bay which is being acoustically altered will receive in an optimum manner the sound of the program being performed. From the preceding description, of course, it will be appreciated that the several characteristics of the electrical circuitry depicted in FIGURE 7 and hereinbefore described will assure that as the reversible motor 30 approaches the point at which its rotation should be terminated to arrive at the proper setting, the motor potentiometer 60 will also be adjusted by movement of its movable tap 61 so that the network which includes this potentiometer, the appropriate control panel potentiometer and the swinging relay 114 will be restored to balance, and the circuit to the reversible motor 30 will be interrupted to stop the motor.

Figure 8C:
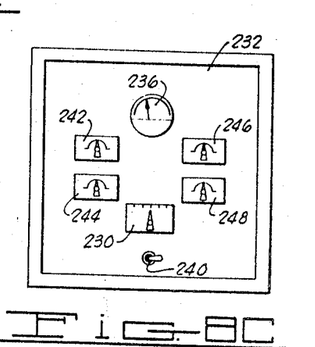
Figure 9:
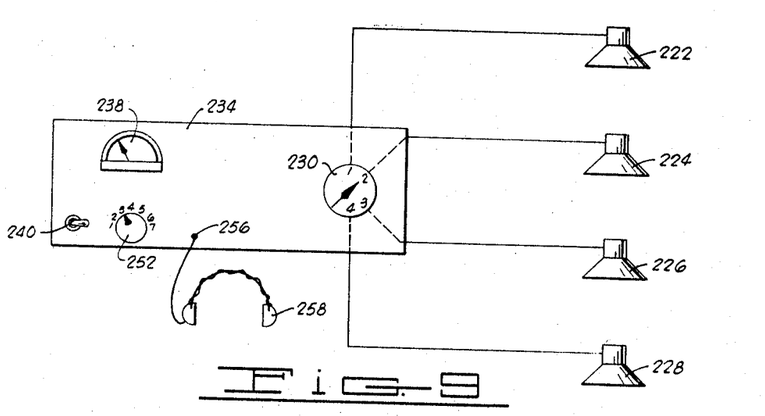
FIGURE 9 is a schematic illustration of yet another electrical circuit which can be used in the control system of the present invention.

Two further control panel arrangements which can be employed in the use of the control system of the invention, and which are simplified to some extent from the control panel 203 shown in FIGURE 8b, are the control panels shown in FIGURE 8c and FIGURE 9. In the case of both types of control panels shown in these figures, a plurality of microphonic pickups or probes are associated with, for example, four bays. These probes are schematically depicted in FIGURE 9 and are indicated by reference numerals 222, 224, 226 and 228, and will be discussed as being associated with bays 1–4, respectively. The leads from the probes 222–228 are connected to contacts on a selector switch 230 so that the probe associated with a selected one of the four bays must be connected to the instrumentation on a control panel. Such control panel may be either of the type shown in FIGURE 8c and designated by reference numeral 232, or of the type shown in FIGURE 9 and designated by reference numeral 234.

In the control panel depicted in FIGURE 8c, a single intensity meter 236 is provided, as is the case with the control panel 234 shown in FIGURE 9, where an intensity meter 238 is provided. As in the control panels previously discussed, a main ON-OFF switch 240 is provided in the case of both of the control panels 232 and 234 shown in FIGURES 8c and 9, respectively. In the case of the control panel 232 depicted in FIGURE 8c, four control panel potentiometers 242-248 are provided for providing individual control of each of the four bays in the manner hereinbefore described. Thus, by the use of the probe selector switch 230, the sound engineer can select the bay which he wishes to monitor by the use of the one of the probes 222-228 which is associated with the selected bay. The sound intensity in the vicinity of this bay will be indicated to the control engineer by the reading developed upon the intensity meter 236. In response to this reading, the operator may then adjust that control panel potentiometer of the group of control panel potentiometers 242-248 which controls the setting on the cylindrical quadrants in the selected bay which, as indicated by the reading on the intensity meter 236, require alteration of position in order to establish the desired sound reverberation times in that vicinity. The same adjustments to all four bays can be made through the use of any or all of the potentiometers 242-248 as the operator shifts the probe selector switch 230 to obtain a reading of the sound intensity adjacent each of the bays.

In the case of the control panel 234 depicted in FIGURE 9, a single potentiometer 252 is provided and is wired in the circuit with the probe selector switch 230 so that selection of a particular probe associated with one of the bays by use of the probe selector switch 230 will automatically connect the single control panel potentiometer 252 with control circuitry of the type which is depicted in FIGURE 7, and which is associated with the same bay being monitored. Thus, selection of one of the probes 222-228 associated with a particular bay by use of the selector switch 230 automatically places the control panel potentiometer 252 in the control circuitry associated with that bay, and the operator can then instantaneously correct any undesirable reverberation time characteristics which may exist adjacent that bay by manipulation of the single control panel potentiometer 252 without any further switching being required.

In addition to the described elements of the control circuitry depicted in FIGURE 9, the control panel 234 is further provided with a jack 256 into which earphones 258 may be plugged to permit the control engineer to actually discern the properties of the sound in the vicinity of the various bays as the selector switch 230 is operated. In other words, the output of each of the probes 222-228 can be individually fed through the control panel 234 to the earphones 258 by sequential switching of the probe selector switch 230 so that the operator can be apprised at any time of the sound characteristics in the vicinity of any selected one of the bays.

Figure 10:
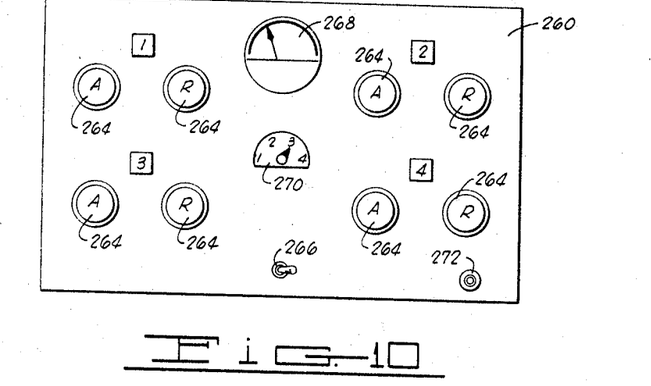
FIGURE 10 is another type of control panel which can be provided in the present invention.
Figure 11:
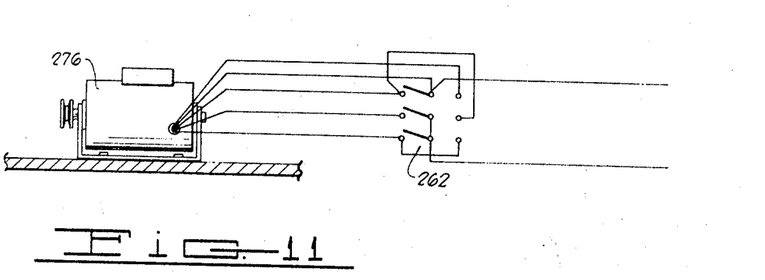
FIGURE 11 is an electrical circuit diagram of electrical circuitry which can be used in conjunction with the control panel illustrated in FIGURE 10.

Yet another type of control panel and associated electrical control circuitry is depicted in FIGURES 10 and 11 of the drawings. Here a control panel 260 is provided for controlling the cylindrical quadrants in four different bays, and a three-position microswitch 262 of the type depicted in FIGURE 11 is provided for controlling the position of the cylinder quadrants in each of the four bays. Each microswitch 262 is normally open and can be moved to either one of two closed positions by depressing against suitable biasing springs, one of two push buttons. The eight push buttons for the four microswitches 262 are each designated by numeral 264 with the two buttons in each pair being labeled A and R, representing an absorbing actuation and a reflecting actuation, respectively. In addition to the eight microswitch buttons 264, the control panel 260 is provided with a main ON-OFF switch 266, an intensity meter 268, and a probe and bay selector switch 270. A jack 272 is also provided so that the sound engineer can plug earphones into the control panel if he desires to directly monitor the sound characteristics adjacent each bay. The control panel 260 can be used in conjunction with electrical circuitry of the type depicted in FIGURE 11 in which each three-positioned microswitch 262 is used to control the energization of a three phase, 5-lead reversible motor 276.

In using the control panel 260, the sound engineer will move the selector switch 270 to a position such that any desired one of the four bays is monitored. By thus moving the selector switch 270, the sound engineer can obtain an audible signal via earphones plugged into the jack 272, and a visual signal by means of the intensity meter 268, both indicative of the sound intensity characteristic in the vicinity of the particular bay of immediate interest. If adjustment in the settings or positions of the acoustic control quadrants in a particular bay is indicated to be required by a less than optimum reading of the intensity meter 268 (or as indicated by the earphones), the sound engineer can then adjust the position of the cylindrical quadrants in that bay in a gross or coarse fashion by the use of the push-button microswitches 262. If, for example, the reading on the intensity meter 268 indicates that too much of the sound is being absorbed, and the sound intensity in the vicinity of the bay under observation is too low, the sound engineer would then depress the push-button 264 marked R and associated with that particular bay in order to bring the sound reflecting surfaces 22 of the cylinder quadrants 16 into a more prominent position to intercept and reflect the sound waves. Of course, with a relatively simplified control panel of this type, the sound engineer can only bring the reading on the intensity meter 268, or the sound delivered to the earphones, to the proper level by a trial and error multiple adjustment method, using both microswitch push-buttons A and R in order to gradually find the optimum relative orientation of the sound absorbing and sound reflecting surfaces of the cylinder quadrants.

Figure 12:
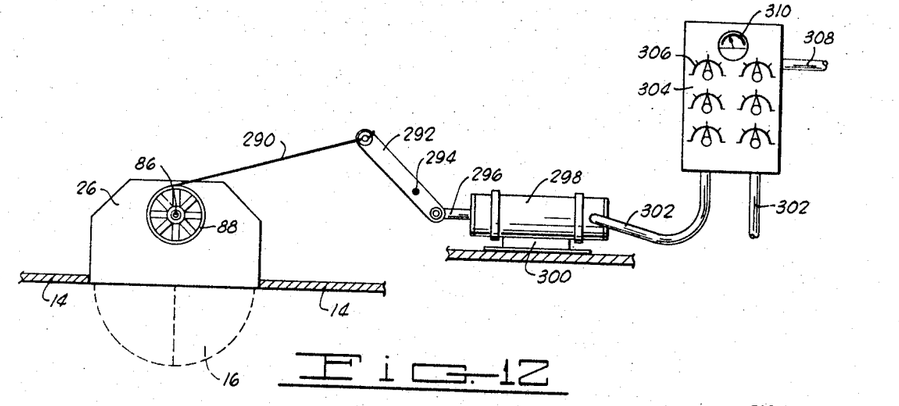
FIGURES 12 and 13 are schematic diagrams of pneumatically actuated control systems constructed in accordance with the present invention and illustrated as they appear in use for controlling acoustic control sectors or quadrants.
Figure 13:
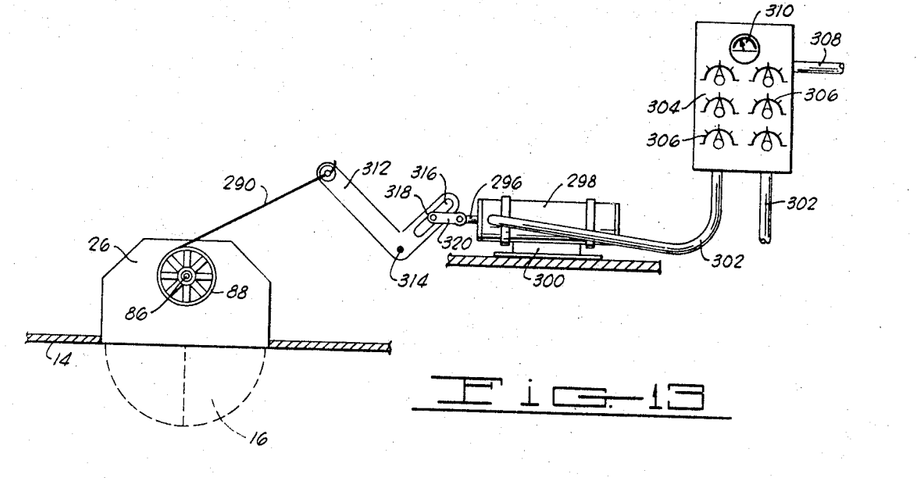

A different embodiment of the control system of the invention is depicted in FIGURES 12 and 13, as such embodiment is applied to the control of the counter-rotational movements of the cylinder quadrant pairs used in acoustic control as hereinbefore described. Since the acoustic control portion of the system depicted in FIGURES 12 and 13 are identical to those which have been previously described, identical reference numerals have been used to identify identical parts. Housings 26 enclose the pairs of cylinder quadrants 16 which are not seen because they are to be in their fully retracted positions. Their extended positions are illustrated in dashed lines. The housings 26 journal an intermediate shaft 86 which carries an operating pulley 88 as previously described. A control cable 290 is connected to the periphery of the operating pulley 86 at one of its ends, and has its other end connected to one end of a suitable crank or drive arm 292. The crank 292 is connected to a pivot pin 294 passed through an intermediate portion thereof and the end of the crank 292 opposite its end which is connected to the control cable 290 is secured to the end of a piston rod 296. The piston rod 296 is secured to a piston (not visible) which is disposed within an air ram cylinder 298. The air ram cylinder 298 can be mounted or supported upon any suitable type of bracket or support 300.

Air for operating the air ram is delivered to one end of the air ram cylinder 298 by an air supply line 302 which is connected to a selector valve panel 304. It should be noted that a plurality of the air supply lines 302 are connected to the selector valve panel 304 according to the number of air rams which are to be actuated by the manipulation of a corresponding number of selector valves 306 located on the selector valve panel 304. A supply of compressed air from a suitable compressed air tank or compressor is delivered to the selector valves 306 on the selector valve panel 304 by a conduit 308. A pressure gauge 310 is provided on the selector valve panel 304 and is connected with the several selector valves 306 so that the total air pressure being delivered to the several air ram cylinders can be always known during operation of the system.

The system depicted in FIGURE 13 is essentially the same as that depicted in FIGURE 12 except that the crank provided for interconnecting the control cable 290 with the piston rod 296 has been modified so that an extension stroke of the piston rod, whereby it is moved further out of the air ram cylinder 298, will result in a slackening of the control cable 290, rather than a tensioning thereof as in the case of the system depicted in FIGURE 12. Thus, in the system depicted in FIGURE 13, an L-shaped crank 312 is provided and has one of its ends connected to the control cable 290 and is mounted upon a pivot pin 314 which is located at the intersection of the two legs of the crank. A second leg of the L-shaped crank carries an elongated slot 316 in which is slidingly mounted a roller 318 carried on one end of a connecting link 320 which is pivotally connected at its other end to the piston rod 296. It is to be further noted that the air supply line from the selector valve panel 304 is connected, in the FIGURE 13 arrangement, to the opposite end of the air ram cylinder 298 from that end to which it is connected in the FIGURE 12 embodiment. Thus, in the case of the retraction stroke of the piston rod 296 during which it is withdrawn further into the cylinder 298 and therefore applies tension to the control cable 290, the air power is applied to the piston enclosed within the air ram cylinder 298 during this portion of the stroke, rather than during the extension stroke as in the case of the FIGURE 12 arrangement. If it should be desired, suitable springs or double acting pneumatic pressure arrangements may be provided in the case of each of the air ram cylinders 298 depicted in the two forms of the invention shown in FIGURES 12 and 13 for the purpose of reversing the stroke of the pistons enclosed within the cylinders.

The operation of the embodiments of the invention depicted in FIGURES 12 and 13 is effected by selective manipulation of the selector valves 306 on the selector valve panel 304 to apply a predetermined air pressure to the air ram cylinders 298 so as to tension the control cables 290, and thereby effect a retraction of the cylinder quadrants into the housings 26 to the extent or degree desired. By proper control of the air pressure applied to the air ram cylinders 298, complete retraction or partial retraction of the quadrants can be realized. Also, the provision of multiple selector valves 306 permits a plurality of bays to be controlled in the manner hereinbefore described by selective application of air pressure to the air ram cylinders 298 which control the tensioning or slackening of the main control cables used in the case of each bay.

From the foregoing description of the invention, it is believed that it will have become apparent that the present invention provides a highly effective control system for simultaneously controlling the rotational movements of a plurality of rigid elements about a coincident axis or about parallel axes, with pairs of such rigid elements being rotated in opposite directions. The system is relatively economical in construction, and is easily maintained due to the inclusion of a minimum number of moving parts, and the relatively simple mechanical and electrical principles that are employed at each individual point within the system. Through the use of the control system in one particularly valuable application, the exact position of pairs of cylinder quadrants constructed to vary the acoustic properties within an auditorium or other enclosure can be constantly controlled and manipulated in a way to adapt the auditorium or space to the performance of substantially any type of sound producing program therein. The control may be effected from a point which is quite remote from the actual location of the cylinder quadrants used to vary the sound reverberation time. It is again to be stressed that, though the control system of the invention has been described with particular reference being made to its use in combination with acoustic control elements of the type typically represented by the cylinder quadrants herein described, the utility of the control system is not limited to the actuation and positioning of such acoustic control units, nor indeed, is the value of the proposed control system limited to the field of acoustics.

In line with such considerations, it can be readily perceived that many variations can be effected in the precise structure and arrangement of the several elements and subcombinations of the invention which are described in the present specification without departure from the basic principles which underlie the invention. All changes and modifications of this type are therefore deemed to be circumscribed by the spirit and scope of the invention.

What is claimed is:
1. A control system for controlling the acoustics of a room comprising:
   at least one pair of rotated elements each constituting a segment of a cyinder and each having an arcuate surface, and having a planar surface extending in a radial plane of the respective cylinder segment with one of said surfaces being constructed of a sound reflecting material and the other of said surfaces being constructed of a sound absorbing material;
   means suporting each of said cylinder segments for rotation of said segments in opposite directions about a common axis or parallel axes;
   a prime mover including means for providing rotational movement in opposite directions with substantially instantaneous reversal of the direction of rotational movement;
   a take-up drum drivingly connected to said prime mover and driven in rotation thereby;
   a main drive flexible element connected to said take-up drum for winding upon the periphery of said drum as said drum is rotated in one direction, and for unwinding from the periphery of the drum as the drum is rotated in the opposite direction;
   local control means including flexible means drivingly connected to a plurality of said cylinder segments and to said main flexible drive element for uniformly and simultaneously moving said cylinder segments in opposite directions about their respective rotational axes when said take-up drum is rotated in either direction; and
   means responsive to the rotation of said take-up drum through a predetermined arc in either direction of rotation to automatically de-energize said prime mover.

2. A control system as defined in claim 1 and further characterized to include:
   sound sensing means spaced from said cylinder segments for sensing sound waves reflected therefrom;
   meter means connected to said sensing means for visually indicating the intensity of sound waves impinging on said sound sensing means;
   a control panel containing said meter means; and
   means for remotely controlling the direction of rotation and the extent of rotational movement of said cylinder segments in either direction of rotation, said means including an actuating element on said control panel adjacent said meter means.

3. A control system as defined in claim 2 wherein said prime mover is a reversible electric motor;
   and wherein said means for remotely controlling the direction and extent of rotational movement of said cylinder segments comprises:
      a first source of electrical power;
      a potentiometer located on said control panel and constituting said actuating element;
      a second source of electrical power; and
      electrical circuitry interconnecting said potentiometer, motor and first and second sources of electrical power for delivering power to said electric motor when the movable tap of said potentiometer is moved.

4. A control system as defined in claim 3 and further characterized to include means responsive to rotation of said electric motor by a preselected amount correlated to the extent of movement of the movable tap of said potentiometer to interrupt the delivery of power to said electric motor.

5. A control system as defined in claim 4 wherein said means responsive to rotation of said electric motor includes a second potentiometer having its movable tap rotated by the rotation of said electrical motor.

6. A control system as defined in claim 2 wherein said prime mover is a reversible electric motor; and
wherein said means for remotely controlling the direction and extent of rotational movement of said cylinder segments comprises:
   a source of electric power;
   a three-position ON-OFF-ON switch located on said control panel and constituting said actuating element; and
   electrical circuitry including said three-position switch, said motor and said source of electric power.

7. A control system as defined in claim 1 wherein said cylinder segments are grouped in pairs, and said pairs of cylinder segments are grouped in bays spaced from each other;
and further characterized to include means for selectively controlling the individual bays to simultaneously rotate in opposite directions from each other, each of the two segments in each pair of segments in the controlled bay.

8. A control system as defined in claim 7 and further characterized to include means for sensing and indicating the intensity of sound waves in the vicinity of each of said bays.

9. An acoustic control system for varying the reverberation time in an enclosed space, said system comprising:
a plurality of sound reflecting elements each mounted for rotation about an axis of rotation with the rotational axes of the several sound reflecting elements extending in parallelism or coincidence, and each of said sound reflecting elements having a sound reflecting surface and a sound absorbing surface disposed about the rotational axis of the element for movement to various positions as said elements are rotated about their respective axes, said surfaces and elements being configured and arranged so that when at least two of said elements are rotated by an equal amount and in opposite directions about their rotational axes, the sound reflecting surfaces of both of said two elements will be brought to a position relative to a point source of sound spaced from the two elements such that sound waves from said source will be reflected from the sound reflecting surfaces of both of said elements;
flexible control cable means secured to each of said two elements for concurrently rotating the elements in opposite directions about their axes as said control cable means is placed in tension;
means connected to said control cable means for selectively tensioning and slackening said control cable means; and
means for automatically deactivating said tensioning and slackening means when said two elements are rotated a predetermined distance about their respective axes.

10. An acoustic control system as defined in claim 9 wherein said tensioning and slackening means comprises:
   an instantly reversible electric motor;
   a gear reducer;
   a flexible resilient belt drivingly connecting said gear reducer to said instantly reversible electric motor; and
   a cable take-up drum drivingly connected to said gear reducer and to said flexible control cable means.

11. An acoustic control system as defined in claim 10 wherein said tensioning and slackening means comprises:
   a cylinder;
   a piston in said cylinder;
   a piston rod connected at one of its ends to said piston and projecting from one end of said cylinder;
   crank means connected to the other end of said piston rod and to said flexible control cable means; and
   means for selectively introducing a power fluid to said cylinder on at least one side of said piston.

12. An acoustic control system as defined in claim 9 wherein said sound reflecting elements are each sectors of a cylinder, said sound absorbing surface is an arcuate surface of the cylinder sector, said sound reflecting surface extends in a radial plane of said cylinder sector and the rotational axis of each sound reflecting element coincides with the longitudinal axis of the imaginary cylinder of which the respective cylinder sector forms a part.

13. An acoustic control system is defined in claim 12 wherein said cylinder sectors are grouped in pairs with the rotational axes of the two sectors in each pair being coincident.

14. An acoustic control system as defined in claim 9 wherein said control cable means comprises:
   a main control cable connected to said tensioning and slackening means;
   a rotatably mounted shaft extending parallel to the rotational axes of a plurality of pairs of said sound reflecting elements;
   flexible connecting elements interconnecting said shaft with each of the sound reflecting elements in said plurality of pairs for rotating the two sound reflecting elements in each of said plurality of pairs in rotation in opposite directions about their rotational axes when said shaft is rotated;
   an operating pulley keyed to said shaft; and
   intermediate cable means interconnecting said operating pulley and said main drive cable for rotating said operating pulley when said main drive cable is placed in tension by said tensioning and slackening means.

References Cited

UNITED STATES PATENTS

| | | | |
|---|---|---|---|
| 1,322,704 | 11/1919 | Locke | 318—265 |
| 1,825,465 | 9/1931 | MacDonald | 181—30 |
| 1,975,604 | 10/1934 | Hanson | 181—33 |
| 2,224,651 | 12/1940 | Jacobs | 181—30 |
| 2,277,983 | 3/1942 | Jacobs | 181—30 |
| 2,344,829 | 3/1944 | McAvoy | 318—265 XR |
| 2,590,204 | 3/1952 | Phillips | 181—33 |
| 3,049,190 | 8/1962 | Coffman | 181—30 XR |

FOREIGN PATENTS 1,333,063  6/1963  France.

ROBERT S. WARD, JR., *Primary Examiner.*

U.S. Cl. X.R.
181—33; 318—265